P. M. J. BOUCHEROT.
TRANSFORMER OF CONTINUOUS CURRENT.
APPLICATION FILED AUG. 28, 1913.

1,206,662.

Patented Nov. 28, 1916.
2 SHEETS—SHEET 1.

INVENTOR
PAUL MARIE JOACHIM BOUCHEROT
by Hanson and Hanson
HIS ATTORNEYS,

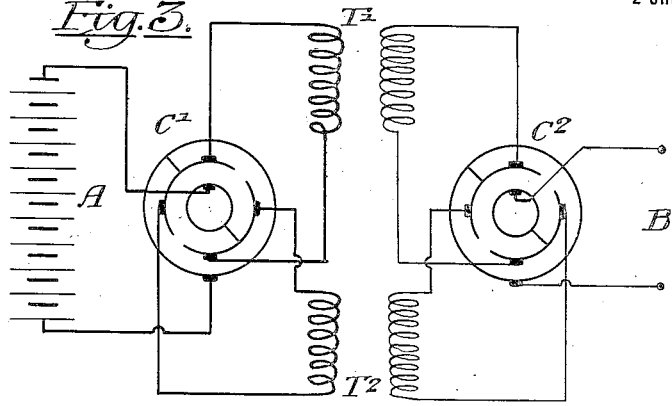
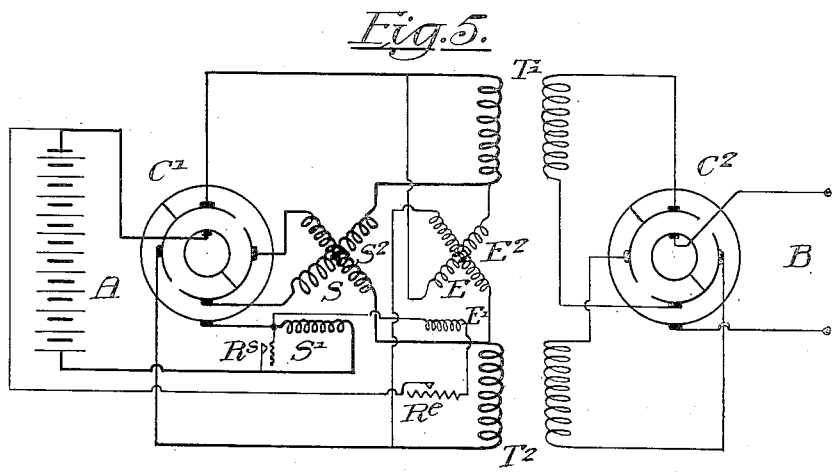
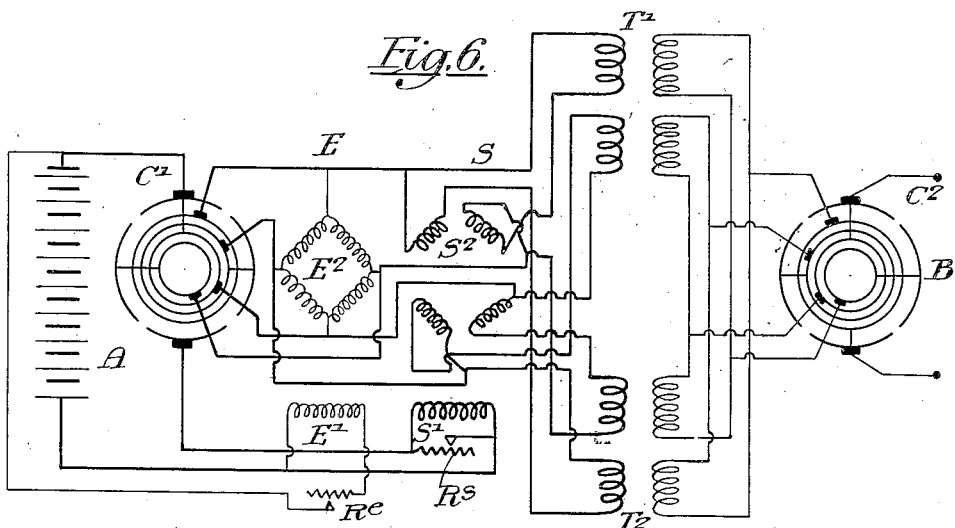
INVENTOR
PAUL MARIE JOACHIM BOUCHEROT
HIS ATTORNEYS.

UNITED STATES PATENT OFFICE.

PAUL MARIE JOACHIM BOUCHEROT, OF PARIS, FRANCE.

TRANSFORMER OF CONTINUOUS CURRENT.

1,206,662.  Specification of Letters Patent.  Patented Nov. 28, 1916.

Application filed August 28, 1913. Serial No. 787,130.

*To all whom it may concern:*

Be it known that I, PAUL MARIE JOACHIM BOUCHEROT, a citizen of the Republic of France, and a resident of Paris, France, have invented a new and useful Transformer of Continuous Current, of which the following is a specification.

The object of the present invention is to effect the transformation of a direct current into another direct current of different pressure and volume. The process employed to accomplish this object may be summarized in three operations: (1) To first transform the direct current into two or more alternating currents by means of a rotary commutator. (2) To then transform these alternating currents into other alternating currents of different electric motive forces and volumes by means of ordinary static transformers. (3) To finally transform these new alternating currents into a direct current by means of a commutator rotating synchronously with the first.

Figure 1:
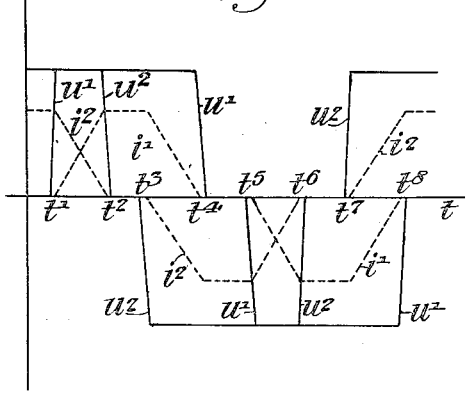
Figure 2:
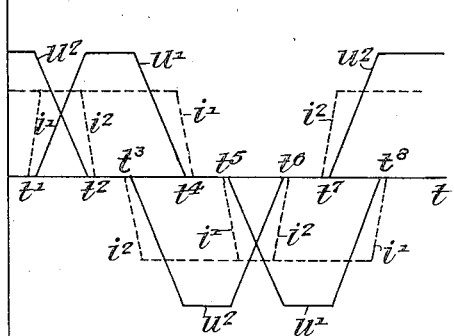
Figure 4:
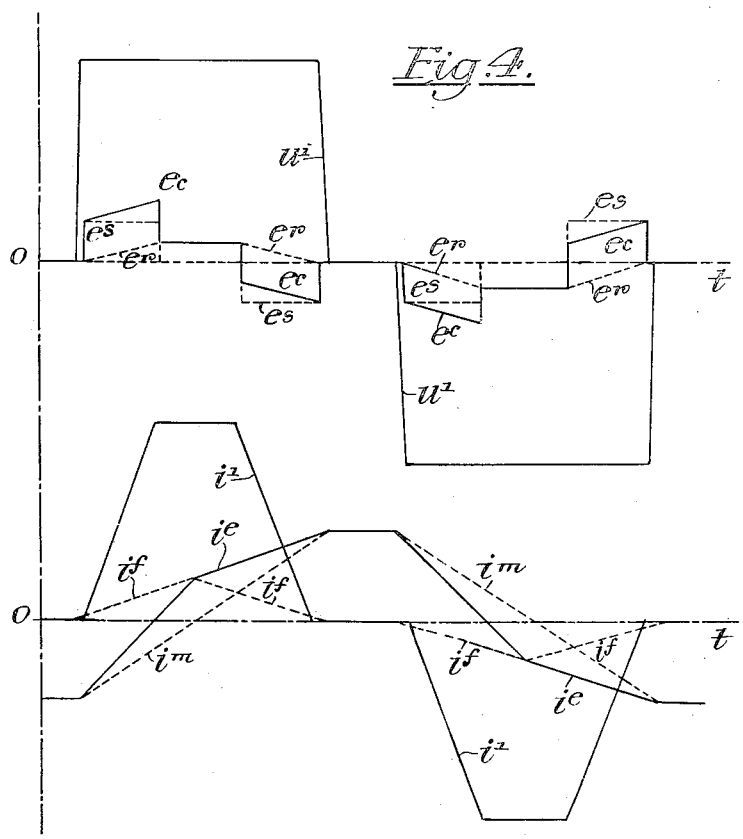

In the accompanying drawings, Figures 1 and 2 are diagrams illustrating the alternating electric motive forces and currents for the arrangement of the transformers in parallel and in series respectively; Fig. 3 is a diagrammatic representation of the connections between the source of electricity, the commutators, the transformers and the utilizing or receiving apparatus; Fig. 4 is a diagram representing the current of a transformer in conjunction with those of an exciting alternator and a compensating alternator; Fig. 5 is a diagrammatic representation of the connections between the source of electricity, the commutators, the transformers, the utilizing or receiving apparatus, the exciting alternator and the compensating alternator; and Fig. 6 is a modification of the arrangement shown in Fig. 5.

The explanation of the invention may be limited to the simple case in which the direct current is divided or resolved into only two alternating currents. In the successive positions of the moving parts, there are moments at which the two static transformers work together. It is therefore possible to distinguish between two very different conditions, that in which the windings of the two transformers are in parallel and that in which these windings are in series. If the windings of the transformers are in parallel, it is necessary that during the periods in which they are coupled the electromotive forces of the two alternating currents should be equal and that the sum of these currents should be constant. If the circuits of the transformers are in series, it is necessary that during the periods in which they are coupled, the two alternating currents should be equal and that the sum of their electromotive forces should be constant.

The electromotive forces and alternating currents are represented, as to duration, in the two cases, by the curves shown in Figs. 1 and 2, which are applicable to either the primaries or the secondaries of the transformers by a change of scale. The transformers are in parallel in Fig. 1, and in series in Fig. 2. The reference $u^1$ indicates the E. M. F. of the current $i^1$, for one of the transformers; $u^2$ the E. M. F. of the current $i^2$ for the other transformer. In the two cases, the transformers should be coupled (a) directly from the point $t^1$, to the point $t^2$, (b) with reversal of the second, from $t^3$ to $t^4$, (c) with reversal of both from $t^5$ to $t^6$, (d) with reversal of the first from $t^7$ to $t^8$. Obviously the form of the curves may vary slightly from those shown, which are merely illustrative in a general way. The horizontal portions may be more or less long according to the fundamental period while the inclined portions are not necessarily straight.

I may enter now into greater detail for the case in which the transformers are coupled in parallel during certain portions of the fundamental period.

Referring to Fig. 3, we connect the source, the commutators, the transformers and the utilizing apparatus, or receptor in accordance with the scheme there illustrated. The reference A indicates any suitable source of direct current. The two rotary commutators $C^1$ and $C^2$ are mounted fast on the same shaft and are rotated at precisely the same speed by means of any suitable motor, electric or otherwise (not shown). Each of these commutators regarded as a whole, is a two-way reversing commutator which connects the two circuits in parallel during a part of the period of rotation and these circuits are shown as including the primaries of two ordinary static transformers $T^1$ and $T^2$. In consequence of the changes in the connections which are effected by the commutator $C^1$, the E. M. F. at the primary terminals of one of the transformers is that represented by the curve $u^2$. The secondary E. M. F$^5$. are of the same form but greater or smaller according to the ratio of transformation. Since the commutator $C^2$ accomplishes the same operations as $C^1$, it results therefore that there is between the terminals B a direct circuit whose E. M. F. or voltage is like that at A but of different value. The utilizing apparatus at B thus receives a direct current transformed from that of the source A. In reality, however, things are not so simple, that is to say, even when no current is taken from the terminals B, the E. M. F. between these terminals is far from being uniform and there are heavy sparks at the commutators. On open circuit, if the tension at the terminals of one of the transformers be as represented at $u^1$ in Fig. 4, the magnetizing or exciting current of the transformer would be represented at $i^m$ of the same figure, and it is precisely at the moment when this current reaches its maximum that the commutator $C^1$ breaks it to reverse the E. M. F., whence results extra current and sparking. It is necessary, therefore, to add to the system some device which will furnish excitation to the transformers. It is easy to see that condensers would not be suitable and that the best thing to do is to employ a small two-phase alternating exciter, mounted on the same shaft as the commutators $C^1$ and $C^2$ and of which each phase, shunted on the primary or on the secondary of one of the transformers furnishes, at a tension such as $u^1$, a current such as $i^m$. In fact, each transformer does not absorb only the exciting current; it absorbs also a current such as $i^t$ corresponding to the losses in the iron of the transformer, due to hysteresis and Foucault currents. But it is immaterial so far as the sparking is concerned whether the current $i^t$ is furnished by the exciting alternator or by the source of current, since it is nil at the moment of rupture. There is consequently no reason for furnishing this current from the exciting alternator except that if it is so taken, then the current emanating from the source A is maintained rigorously constant. In this case, the exciting alternator should deliver, by phase, under an E. M. F. such as $u^2$, a current such as $i^e$, which is the resultant of $i^m$ and $i^t$. It is is obvious that the exciting alternator should be supplied with direct current taken from the source, or from the receptor, but in shunt, in such manner that when the direct current voltage varies, the E. M. F. of the exciting alternator varies proportionately. But the addition of the exciting alternator is insufficient if the direct current is taken from the terminals B of Fig. 3, because the windings of the transformer have resistance and leakage reactances which cause drops of voltage, both ohmic and reactive. It is necessary, in principle, to nullify, in each circuit of each transformer, the drop of voltage due to resistance, proportional to the current and the electromotive force of self-induction and proportional to the shunting of current in a given period. But in practice, it is sufficient to introduce into only one of the circuits of each transformer an electromotive force such as $e^c$ in Fig. 4 which at any moment is equal to the sum of two others, viz., $e^r$, proportional to the current, which nullifies the ohmic drops of the two circuits, and $e^s$, proportional to the shunting of current, which annuls the electromotive force of self inductance of the two circuits. This is accomplished by the introduction of another small two phase alternating compensator, likewise mounted on the same shaft as the commutators $C^1$ and $C^2$, and of which each phase, connected in series in one of the circuits of one transformer (that of low tension, by preference) furnishes a current such as $i^1$, at an E. M. F. such as $e^c$. In theory, the current which flows in one induced circuit of this alternator is the resultant of $i^1$ and $i^e$ but $i^e$ is in reality much smaller than $i^1$ and it is not necessary that it should be precisely as shown in Fig. 4. To render this diagram more clear, the importance of $i^m$, $i^t$ and $i^e$ with respect to $i^1$ has been exaggerated, and similarly the importance of $e^r$, $e^s$ and $e^c$ with respect to $u^1$ has been exaggerated. It is thus clear that this alternating compensator should be excited by placing its inductor circuit in series in the pricipal circuit from the source or at the receiving instrument, in such manner that the electromotive forces of this alternator vary in proportion to the direct current transformed or to be transformed. There is thus reached for the case of a step-up transformer of E. M. F., an arrangement such as represented in Fig. 5, in which E is the exciting alternator of which $E^1$ is the inductor circuit and $E^2$ the induced circuit. S is the compensating alternator, of which $S^1$ is the inductor circuit and $S^2$ the induced circuit. The other reference letters have the same significance as in Fig. 3. The induced and inducing circuits of the alternator E are shown as connected to the source at points beyond the corresponding circuits of the alternator $S^1$, but they may be connected in front of it.

For each of the alternators, the induced circuit may be stationary and the inductor circuit movable, or vice versa. The two commutators and the rotors of the two alternators mounted on the same axis are driven by any suitable motor, electric or otherwise. A rheostat $R^e$ is interposed in the inductor circuit of the alternator E; and a second rheostat $R^s$ connected in shunt with the inductor circuit of the alternator S, to suitably regulate the excitation and prevent sparking at the commutators $C^1$ and $C^2$, during operation. This accomplished, it is evident that the voltage and the current from the direct current source may vary widely without affecting the operation of the apparatus if neither the alternators nor the transformers are saturated. In the case of a step down transformer, the arrangement would be the same; the source taking the place of the receptor and vice versa.

The ratio of transformation remains constant or almost so and if it be desired to modify it, it is necessary to modify the ratio of transformation of the static transformers by one of the known methods, for example, by changing the number of coils in one of the circuits. This may be of advantage under certain conditions where, having a constant primary E. M. F. it is desired to step-down the secondary E. M. F. for starting motors without the interposition of rheostats.

It is possible to replace the ordinary static transformers by auto-transformers; that is to say, by transformers of which one portion of the winding is common to both primary and secondary, when it is proposed simply to fraction a low E. M. F. It is also obviously possible to operate the exciting and compensating alternators each through a small transformer instead of connecting them directly.

As has already been stated above, it is possible to divide the direct current of the source into a large number of alternating currents. Fig. 6 shows diagrammatically a modification in which there are four alternating currents, the windings of the transformers working in series. But inasmuch as these currents are, at any moment, respectively equal but of different polarities, we may employ only two transformers $T^1$ and $T^2$, each having two primary windings and two secondary windings. In this case, E is a four phase exciting alternator, of which $E^1$ is the inductor and $E^2$ the induced circuit, of which the windings are in shunt to the primaries of the transformers. The compensating alternator S is likewise four phase with an inductor circuit $S^1$ and an induced circuit $S^2$ of which the windings are in series with the primaries of the transformers. $R^e$ is a regulating rheostat arranged in series in the inductor circuit of the alternator E, which is always connected in shunt with the source or with the receiving circuit. $R^s$ is a regulating rheostat in shunt with the inductor circuit of the alternator S which is always connected in series with the source or the receptor. The commutators $C^1$, $C^2$ each have four conductor segments and four rings which take current from or lead it to the segments. The brushes bearing on the segments should be sufficiently large to always contact with one segment or another; that is to say, when one brush straddles two segments, it short circuits a group comprising one winding of the transformer and one winding of the compensating alternator in series, just as a brush of an ordinary direct current machine short circuits one section of the armature. At this moment the winding of the short circuited transformer is evidently the recipient of a zero electromotive force, but the winding of the corresponding compensating alternator develops an electromotive force which insures the reversal of current in this closed circuit. If reference is made to Fig. 2, it is obvious that $i^2$, for example, would be reversed between the points $t^2$ and $t^3$ and between the points $t^6$ and $t^7$. Each winding of the compensating alternator has still to furnish here an electromotive force which is the sum of two others, one proportional to the current to nullify ohmic drop, the other proportional to the shunt current, to nullify the electromotive force of self induction of the primary and secondary currents of the transformer. On the other hand, each winding of the exciting alternator has to furnish an E. M. F. such as $u^1$ of the same amount, while receiving magnetizing current and a current for the losses in the iron of the transformer. At first sight, it would seem that the exciting alternator has not the same utility here that it has when the transformers are coupled in parallel, since the source is always connected with the primaries and there is no danger of the magnetizing currents being broken at the moment of their maximum. This is but an apparent condition, however; considering for the sake of simplicity only the conditions when the circuit is open, if there is no exciting alternator when the two primary windings of the transformers are in series, the magnetizing current would be necessarily the same in both, since it is two phase for a quarter of a period in the one with respect to the other, with the result that there are sparks at the commutator $C^1$. It is superfluous to represent further in this case the curves of the different currents and tensions as they differ very little from that of Fig. 4.

I claim as my invention:—

1. A direct current transformer consisting of a plurality of successively working static transformers, a pair of rotary commutators respectively connected, one to the primary windings of said transformers and to the generator of direct current, the other to the secondary windings of the same transformers and to the receptor of direct current, and an exciting alternator, operating in synchronism with said commutators, and having each of its induced windings permanently connected in shunt with one of the windings of each transformer, and having its inducing windings permanently connected in shunt with one of the direct current apparatus.

2. A direct current transformer consisting of a plurality of successively working static transformers, a pair of rotary commutators respectively connected, one to the primary windings of said transformers and to the generator of direct current, the other to the secondary windings of the same transformers and to the receptor of direct current, and a compensating alternator, operating in synchronism with said commutators, and having each of its induced windings permanently connected in series with one of the windings of each transformer, and having its inducing windings permanently connected in series with one of the direct current apparatus.

3. A direct current transformer, consisting of a plurality of successively working static transformers, a pair of rotary commutators, respectively connected, one to the primary windings of said transformers and to the generator of direct current, the other to the secondary windings of the same transformers and to the receptor of direct current, an exciting alternator, operating in synchronism with said commutators, having each of its induced windings permanently connected in shunt with one of the windings of each transformer, and having its inducing windings permanently connected in shunt with one of the direct current apparatus, and a compensating alternator, operating in synchronism with said commutators, having each of its induced windings permanently connected in series with one of the windings of each transformer, and having its inducing windings permanently connected in series with one of the said direct current apparatus.

In testimony whereof I have signed my name to this specification in presence of two subscribing witnesses.

PAUL MARIE JOACHIM BOUCHEROT.

Witnesses:
FERNAND SINAULT,
LÉON PEILLET.